United States Patent
Iwatani et al.

(10) Patent No.: US 6,313,613 B1
(45) Date of Patent: Nov. 6, 2001

(54) CONTROLLER AC GENERATOR FOR VEHICLE

(75) Inventors: Shiro Iwatani; Katsuhiro Sasaki, both of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/508,165

(22) PCT Filed: Sep. 11, 1997

(86) PCT No.: PCT/JP97/03213

§ 371 Date: Mar. 8, 2000

§ 102(e) Date: Mar. 8, 2000

(87) PCT Pub. No.: WO99/13566

PCT Pub. Date: Mar. 18, 1999

(51) Int. Cl.[7] .................................................. H02P 9/04
(52) U.S. Cl. ........................................ 322/12; 322/99
(58) Field of Search .............................. 322/22, 28, 25, 322/12, 99

(56) References Cited

U.S. PATENT DOCUMENTS

| | | | |
|---|---|---|---|
| 4,316,134 | * | 2/1982 | Balan et al. ........................ 322/99 |
| 4,345,199 | * | 8/1982 | Voss ................................. 322/28 |
| 4,379,990 | * | 4/1983 | Sievers et al. ..................... 322/99 |
| 4,451,774 | * | 5/1984 | Akita et al. ....................... 320/64 |
| 4,636,706 | * | 1/1987 | Bowman et al. ................... 322/28 |
| 5,719,487 | * | 2/1998 | Sato et al. ........................ 322/28 |
| 5,739,676 | * | 4/1998 | Judge et al. ....................... 322/22 |

FOREIGN PATENT DOCUMENTS 61-244234   10/1986   (JP).

* cited by examiner

Primary Examiner—Nicholas Ponomarenko
(74) Attorney, Agent, or Firm—Sughrue, Mion, Zinn, Macpeak & Seas, PLLC

(57) ABSTRACT

A vehicle AC-generator controller includes a storage battery to be charged by a rectification output of an AC generator having a field coil, a voltage regulator for controlling an output voltage of the AC generator to a predetermined value by controlling a field current flowing through the field coil, an indicator lamp for indicating a power-generation state and a no-power generation state of the AC generator, an indicator-lamp driving element for turning on and off the indicator lamp, a power-supply driving element for driving power supply of the voltage regulator in accordance with a turn-on-lamp output of the indicator-lamp driving element, and a power-supply cutoff element for cutting off the power-supply driving apparatus by controlling the turn-on-lamp output to the ground potential when the AC generator is brought into the no-power-generation state.

4 Claims, 3 Drawing Sheets

CONTROLLER AC GENERATOR FOR VEHICLE

TECHNICAL FIELD

The present invention relates to a vehicle AC-generator controller for establishing a no-power-generation state in which no power is generated by cutting off the field current of a vehicle AC-generator when the vehicle AC-generator is brought into the no-power-generation state in order to reduce the load of an engine, for example, upon start of the engine.

BACKGROUND ART

FIG. 3 is a block diagram of a conventional vehicle AC-generator controller disclosed in, for example, Japanese Patent Publication No. 3-47058. In FIG. 3, an AC generator 1 includes a rotor winding 102 and three three-phase stator windings 101R to 101T connected with each other in a star-like manner. Diode bridges comprising a full-wave rectifier 2 are provided for each phase of the three stator windings 101R to 101T. Voltages induced in the stator windings 101R to 101T by the rotor winding 102 are full-wave rectified by the full-wave rectifier 2 and applied to a charge terminal B of a battery 8 through an output terminal 201.

An output voltage of the AC generator 1 is adjusted by a voltage regulator 3 in accordance with a charge voltage detected by the charge terminal B of the battery 8. A source voltage is supplied to the voltage regulator 3 by the battery 8 through an externally provided engine key 7 and transistor 5.

The voltage regulator 3 includes a control monolithic IC 303 for detecting a charge voltage through the charge terminal B of the battery 8 to output a field-current control signal having a predetermined duty ratio corresponding to the level of the charge voltage as well as for detecting a no-power-generation state of the AC generator 1 in accordance with an induced voltage applied to the stator winding 101S to output a no-power-generation detection signal, a power transistor 306 having a base adapted to be inputted by a field-current control signal, a grounded emitter and a collector connected to the positive side of the battery 8 through a reversely connected diode, and a power transistor 301 having a base adapted to be inputted by a no-power-generation detection signal, a grounded emitter and a collector connected to an end of a charge lamp 6.

Moreover, when the power transistor 306 is turned on, a field current flows through the rotor winding 102, power transistor 306 and ground from the battery 8. Moreover, when the power transistor 301 is turned on, a current flows from the battery 8 to ground through the engine key 7, charge lamp 6 and power transistor 301 to turn on the charge lamp 6. Resistances 302 and 304 for applying a base voltage to the power transistors 301 and 306 are connected between the bases of the power transistors 301 and 306 and the power-supply line of the control monolithic IC 303.

A transistor 301 constituting an external unit 4 is connected at its collector to the base of the transistor 5 for supplying a source voltage to the control monolithic IC 303 through a resistance 402. An emitter of the transistor 301 is grounded and a signal indicative of the driving state of a vehicle (a driving-state signal) is input to the base of the transistor 301 from various sensors and switches (not shown).

In this case, the operation-state signal denotes a signal such as an on-output signal of an unillustrated starter switch or an engine-cooling-water-temperature signal of an unillustrated water temperature sensor. The external unit 4 inputs an off signal to the transistor 301 for a certain period of time in accordance with each signal in order to reduce the load of an engine when the engine is started. As a result, the transistor 5 is turned off, thereby cutting off the supply of power from the battery 8 to the control monolithic IC 303 and stopping the generation of a field current.

In the operation of a conventional controller, when the control monolithic IC 303 detects a voltage drop of the battery 8 after an engine is started, it turns on and off the power transistor 306 at a predetermined duty ratio to intermittently supply a field current to the rotor winding 102 from the battery 8. By supplying the field current, an induced voltage is generated in the stator windings 101R to lost by a magnetic field generated in the rotor winding 102. Moreover, the generated induced voltage is full-wave rectified by the full-wave rectifier 2, applied to the charge terminal B through the output terminal 201, and charged to the battery 8.

Moreover, when the control monolithic IC 303 detects a voltage drop of the battery 8 immediately after the engine key 7 has been turned on (i.e., immediately after the engine has been started), the monolithic IC 303 turns on the power transistor 306 to supply a field current to the rotor winding 102 from the battery 8 to thereby form a magnetic field in the AC generator 1. In this case, however, because the engine is not operated to run, the AC generator 1 does not generate power, resulting in the no-power-generation state.

When the control monolithic IC 303 detects the no-power-generation state from the stator winding 101S, it drives the power transistor 301 to turn on the charge lamp 6, thus notifying the driver that the battery 8 is currently discharging.

However, when the AC generator 1 starts the power-generating operation by forming a magnetic field in the generator 1 immediately after an engine has started, particularly during a cold period when the function of a battery is deteriorated, the engine rotation becomes unstable due to fluctuation of the generator load torque. Therefore, immediately after start of the engine, the transistor 5 is turned off upon an operation-state signal being inputted to the transistor 301 in the form of the external unit 4 for a certain time until the speed of the engine reaches a predetermined value, thereby turning off the transistor 301 to cut off the supply of power to the control monolithic IC 303. Because the supply of power is cut off, the control monolithic IC 303 stops generating an output to the power transistor 306 to thereby cut off the field current, and hence the AC generator 1 is forced into the no-power-generation state.

Thus, because the source voltage of the control monolithic IC 303 is cut off, no field current is supplied to the rotor winding 102 and the AC generator 1 is brought into the no-power-generation state. However, when the above configuration is used, the transistor 5 having a large current capacity for cutting off a power supply is necessary in addition to the external unit 4 and thus, a large-scale circuit configuration is required.

Moreover, if, for any reason, a leak current is supplied to the power-supply terminal of the control monolithic IC 303 due to a positive potential, a problem occurs in that the power supply cannot be cut off by the external unit 4 and thus, the no-power-generation state cannot be realized.

The present invention is intended to solve the above problems and its object is to provide a vehicle AC-generator controller capable of bringing an AC generator into a no-power-generation state by cutting off a field current in order to reduce the load of an engine upon starting thereof.

DISCLOSURE OF THE INVENTION

The present invention according to one aspect includes a vehicle AC-generator controller includes a storage battery to be charged by a rectification output of an AC generator having a field coil, a voltage regulator for controlling an output voltage of the AC generator to a predetermined value by controlling a field current flowing through the field coil, detection means for detecting a power-generation state and a no-power-generation state of the AC generator, an indicator lamp for indicating the power-generation state and the no-power-generation state of the AC generator, indicator-lamp driving means for turning on and off the indicator lamp in accordance with the detection result of the detection means, power-supply driving means for driving a power-supply circuit of the voltage regulator in accordance a turn-on-lamp output of the indicator-lamp driving means, and power-supply cutoff means for cutting off the power-supply driving means by controlling the turn-on-lamp output to a ground potential when the AC generator is brought into the no-power-generation state.

Upon start of an internal combustion engine of a vehicle, the power-supply cutoff means of the present invention controls the turn-on-lamp output to the ground potential for a certain time to thereby cut off the power-supply driving means so that the AC generator is thereby brought into the no-power-generation state.

The present invention according to another aspect includes a storage battery to be charged by a rectification output of an AC generator having a field coil, switching means to be turned on and off at a predetermined ratio to intermittently supply a field current to the field coil, a voltage regulator for controlling an output voltage of the AC generator to a predetermined value by inputting a control signal for controlling an on/off ratio of the switching means, and field-current cutoff means for cutting off a field current by controlling a signal input section of the switching means to a ground potential when the AC generator is brought into a no-power-generation state.

Upon start of an internal combustion engine of a vehicle, the field-current cutoff means of the present invention controls the signal input section of the switching means to the ground potential for a predetermined time to thereby cut off the field current so that the AC generator is thereby brought into the no-power-generation state.

BEST MODE FOR CARRYING OUT THE INVENTION

Figure 1:
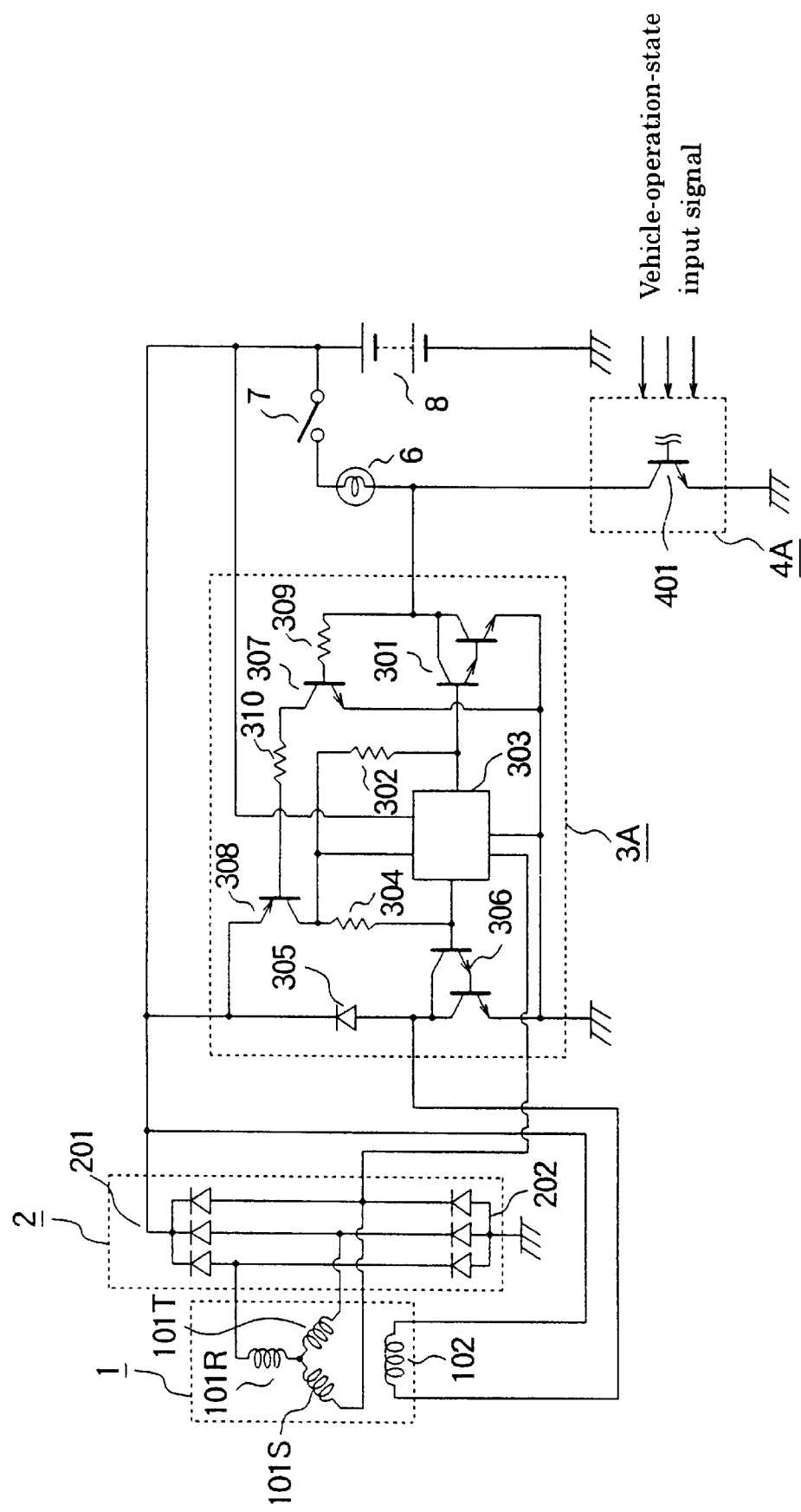
FIG. 1 is a block diagram of a vehicle AC-generator controller according to embodiment 1 of the present invention.

The present invention will be described in greater detail below with reference to the accompanying drawings.
Embodiment 1

The embodiment 1 of the present invention will be described below with reference to the accompanying drawings. Portions that are the same as or correspond to those of a conventional controller have the same reference numerals.

FIG. 1 is a block diagram of a vehicle AC-generator controller of this embodiment. Compared to the above-described conventional controller, the vehicle AC-generator controller of this embodiment dose not have the transistor 5 for directly supplying a battery voltage to a control monolithic IC 303.

Moreover, a voltage regulator 3A of this embodiment includes a transistor 307 having a grounded emitter and a base connected to a collector of a power transistor 301 for turning on a charge lamp through a resistance 309, and a transistor 308 having an emitter connected to a positive terminal of a battery 8 and a collector connected to a base of a power transistor 306 for outputting a field current through a resistance 304. Moreover, the transistor 307 has a collector connected to the base of the transistor 308 through a resistance 310.

Furthermore, the voltage regulator 303 and the stator winding 101S together constitute a detection means; the power transistor 301 constitutes an indicator-lamp driving means; the transistor 308 and the resistance 309 together constitute a power-supply driving means; and the external unit 4A constitutes a power-supply cutoff means.

Next, the operation of this embodiment will be described below. First, when supplying a source voltage to the control monolithic IC 303 from the battery 8, by turning on an engine key switch 7, a battery voltage is applied to the base of the transistor 307 through a charge lamp 6 and the resistance 309. As a result, the transistor 307 is turned on and a current flows through a resistance 310, the collector, and the emitter thereof. When the current flows, the transistor 308 is turned on and a battery voltage is applied to the power-supply terminal of the control monolithic IC 303 through the emitter and collector of the transistor 308.

When the control monolithic IC 303 detects a voltage drop of the battery 8 after start of the engine, it turns on the power transistor 306, thus permitting a field current to intermittently flow from the battery 8 to the rotor winding 102 to cause the AC generator 1 to generate power.

Moreover, when the control monolithic IC 303 detects based on the voltage of the stator winding 101S that the power-generation output of the AC generator 1 is in the no-power-generation state upon engine starting, the control monolithic IC 303 drives the power transistor 301 to turn on the charge lamp 6 so that the driver is thereby notified of the battery 8 being currently discharging.

Next, the operation for bringing the AC generator 1 into the no-power-generation state in order to reduce the load of an engine upon engine starting will be described below. By inputting an operation-state signal to a transistor 401 constituting an external unit 4A to turn it on when the engine is started, the voltage applied to the charge lamp 6 is brought into the ground potential through the transistor 401.

Therefore, the base voltage of the transistor 309 is brought into the ground potential so that the transistor 309 is turned off to thereby cut off the base current of the transistor 308, thus turning it off. When the transistor 308 is turned off, the battery voltage applied to the control monolithic IC 303 is cut off. As a result, a field-current control signal is not inputted to the power transistor 306 from the control monolithic IC 303 and thus, the transistor 306 is turned off and the no-power-generation state is attained because a magnetic field is not generated in the rotor winding 102 by a field current.

As described above, this embodiment makes it possible to inexpensively configure a controller and reduce its size because it is unnecessary to externally provide a source-voltage-cutoff transistor other than the external unit 4A between the voltage regulator 3A and the output terminal of the battery 8.

Moreover, because the controller of this embodiment is constructed such that a source voltage is not directly supplied to the power-supply terminal of the control monolithic IC 303 from the battery 8, the problem is solved wherein a leak current is generated in the power-supply terminal due to a positive potential which disables the power-supply cutoff operation so that the no-power-generation state cannot be realized. Thus, it is possible to improve the reliability of the controller.

Embodiment 2

In the above-described embodiment 1, the supply of a field current to the rotor winding 102 is stopped by stopping the operation of the control monolithic IC 303 so that the AC generator 1 is brought into the no-power-generation state. However, in embodiment 2, the operation of a control monolithic IC 303 is continued while cutting off only the field current which is to be supplied to the rotor winding 102.

Figure 2:
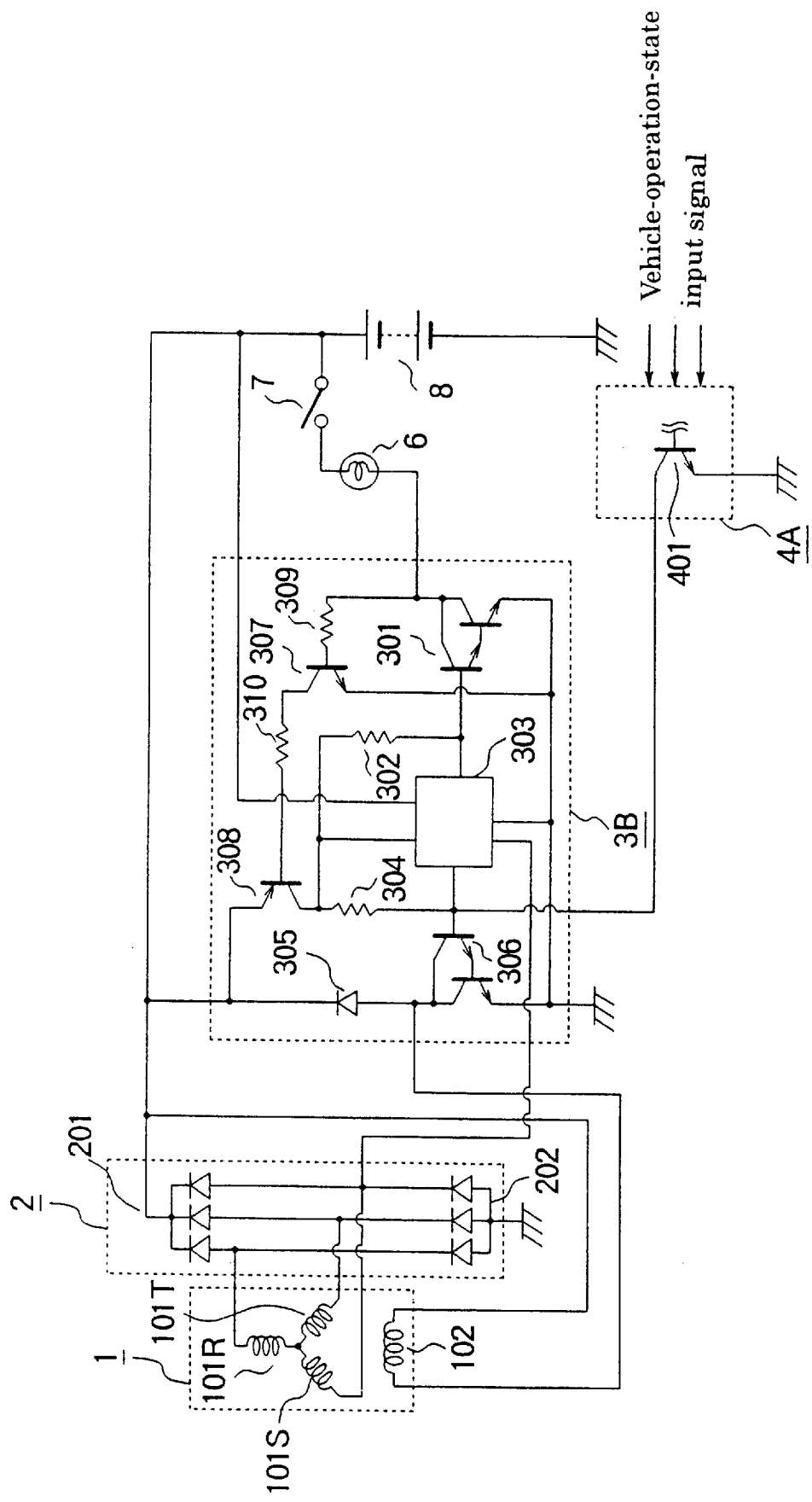
FIG. 2 is a block diagram of a vehicle AC-generator controller according to embodiment 2 of the present invention.
Figure 3:
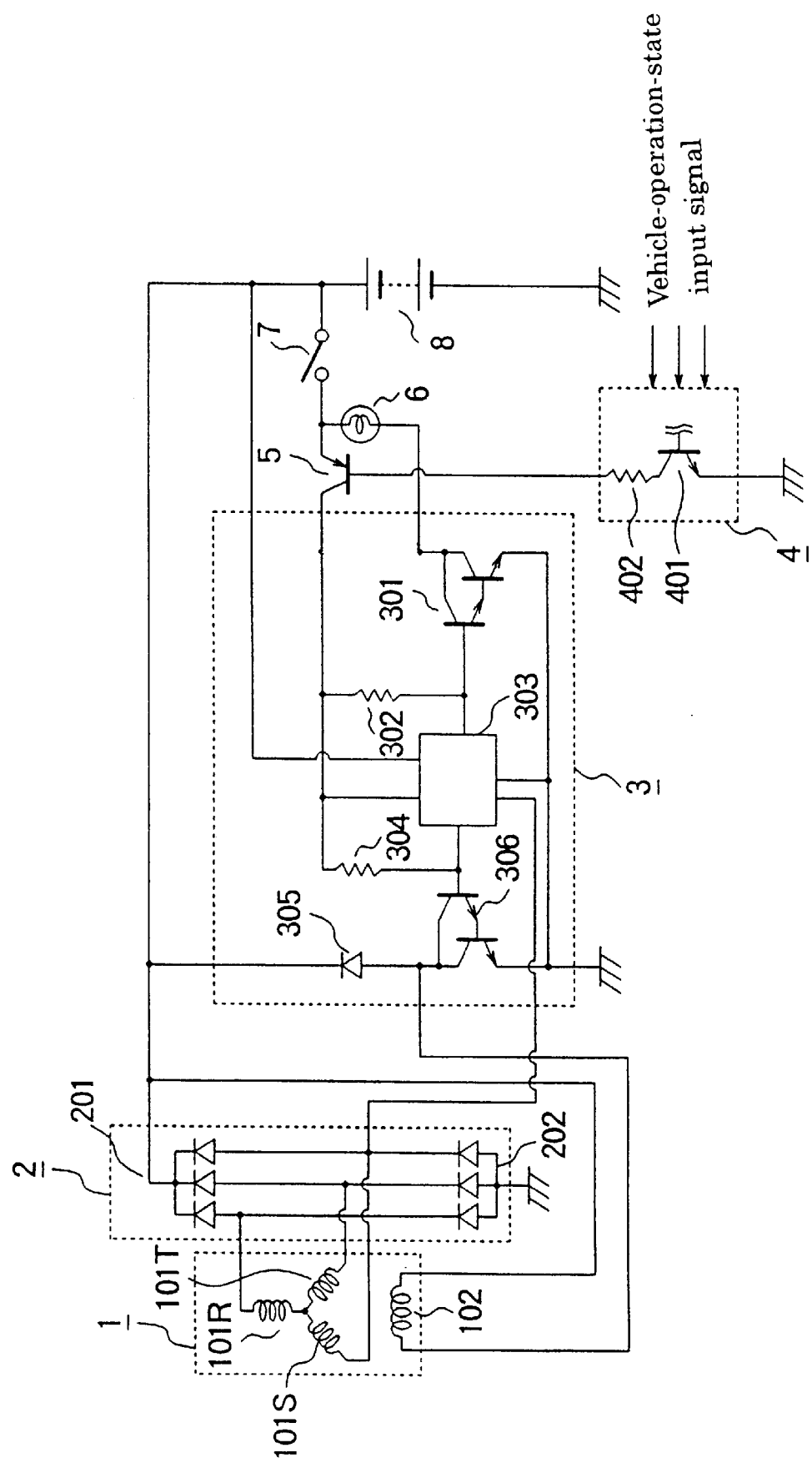
FIG. 3 is a block diagram of a conventional vehicle AC-generator controller.

FIG. 2 is a block diagram of a vehicle AC-generator controller according to this embodiment. In FIG. 2, the same reference numerals as those in FIG. 1 denote the same or corresponding portions. An external control unit 3B of this embodiment is not connected to one end of the charge lamp 6 but is connected to the base of the field-current output power transistor 306.

Moreover, the power transistor 306 constitutes a switching means, and the external unit 4B constitutes a field-current cutoff means.

Therefore, according to the above configuration, in order to bring the AC generator 1 into the no-power-generation state by stopping the field current to be supplied to the rotor winding 102 upon start of the engine, the power transistor 306 is turned off by inputting an operation-state signal to a transistor 301 constituting the external unit 4B for a certain time to turn on the transistor 301 whereby the base of the power transistor 306 is set to the ground potential.

As a result, it is possible to cut off the field current to be supplied to the rotor winding 102, thus bringing the AC generator 1 into the no-power-generation state. In this case, because the control monolithic IC 303 detects the no-power-generation state through the stator winding 101S of the AC generator 1, it is operated to supply a base current to the power transistor 301 to turn it on, so that the charge lamp 6 is lit to indicate the no-power-generation state to the operator.

Thus, because this embodiment temporarily stops the field current to be supplied to the rotor winding 102 while maintaining the operating state of the control monolithic IC 303, in addition to the advantages of the embodiment 1, it is possible to smoothly start the power-generating operation of the AC generator 1.

INDUSTRIAL APPLICABILITY

As described above, the present invention is suited to constructing a controller with a reduced circuit scale and improved reliability, which serves to forcibly bring an AC generator into a no-power-generation state in order to reduce the load of an engine upon start thereof.

What is claimed is:

1. A vehicle AC-generator controller characterized by:
   a storage battery to be charged by a rectification output of an AC generator having a field coil;
   a voltage regulator for controlling an output voltage of the AC generator to a predetermined value by controlling a field current flowing through the field coil;
   detection means for detecting a power-generation state and a no-power-generation state of the AC generator;
   an indicator lamp for indicating the power-generation state and the no-power-generation state of the AC generator;
   indicator-lamp driving means for turning on and off the indicator lamp in accordance with the detection result of the detection means;
   power-supply driving means for driving a power-supply circuit of the voltage regulator in accordance a turn-on-lamp output of the indicator-lamp driving means; and
   power-supply cutoff means for cutting off the power-supply driving means by controlling the turn-on-lamp output to a ground potential when the AC generator is brought into the no-power-generation state.

2. The vehicle AC-generator controller according to claim 1, characterized in that upon start of an internal combustion engine of a vehicle, the power-supply cutoff means controls the turn-on-lamp output to the ground potential for a certain time to thereby cut off the power-supply driving means so that the AC generator is thereby brought into the no-power-generation state.

3. A vehicle AC-generator controller characterized by:
   a storage battery to be charged by a rectification output of an AC generator having a field coil;
   switching means to be turned on and off at a predetermined ratio to intermittently supply a field current to the field coil;
   a voltage regulator for controlling an output voltage of the AC generator to a predetermined value by inputting a control signal for controlling an on/off ratio of the switching means; and
   field-current cutoff means for cutting off a field current by controlling a signal input section of the switching means to a ground potential when the AC generator is brought into a no-power-generation state.

4. The vehicle AC-generator controller according to claim 3, characterized in that upon start of an internal combustion engine of a vehicle, the field-current cutoff means controls the signal input section of the switching means to the ground potential for a predetermined time to thereby cut off the field current so that the AC generator is thereby brought into the no-power-generation state.

* * * * *